July 7, 1925. 1,544,759
C. E. JOHNSON
AUTOMATIC RESILIENT PRESSURE FITTING PISTON RING CONSTRUCTION FOR THE
PISTONS OF AUTOMOBILE AND OTHER ENGINES
Filed March 21, 1924
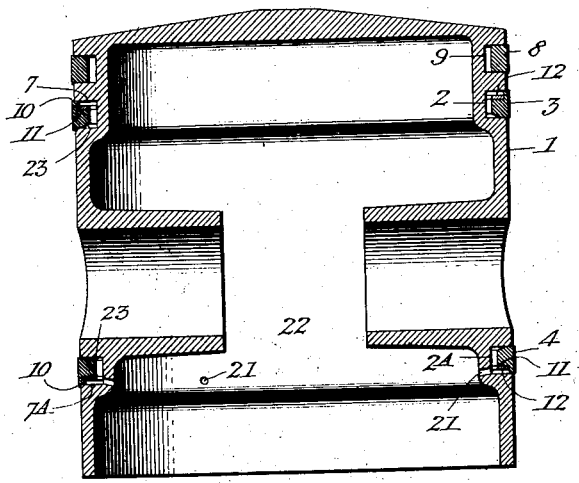
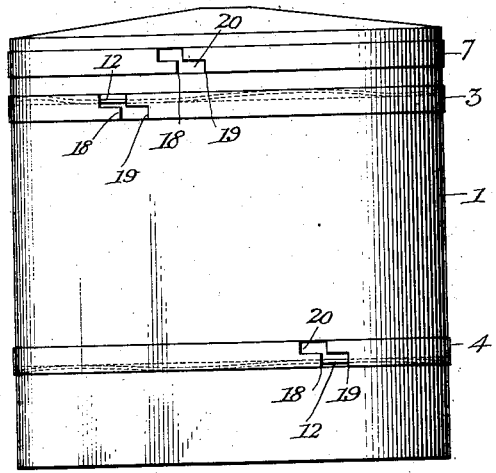
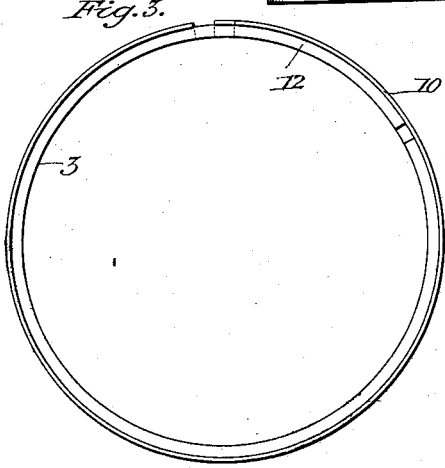
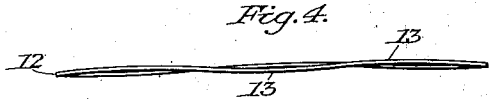
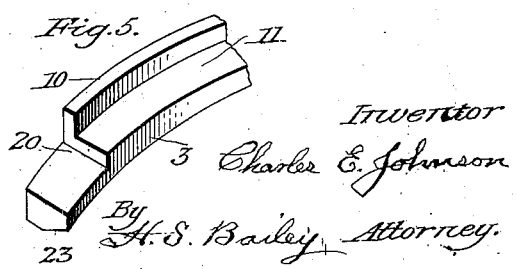
Inventor
Charles E. Johnson
By H. S. Bailey, Attorney.

Patented July 7, 1925.

1,544,759

UNITED STATES PATENT OFFICE.

CHARLES E. JOHNSON, OF DENVER, COLORADO.

AUTOMATIC RESILIENT-PRESSURE-FITTING PISTON-RING CONSTRUCTION FOR THE PISTONS OF AUTOMOBILE AND OTHER ENGINES.

Application filed March 21, 1924. Serial No. 700,849.

*To all whom it may concern:*

Be it known that I, CHARLES E. JOHNSON, a citizen of the United States of America, residing at the city and county of Denver and State of Colorado, have invented a new and useful Automatic Resilient-Pressure-Fitting Piston-Ring Construction for the Pistons of Automobile and Other Engines, of which the following is a specification.

My invention relates to a new automatic resilient pressure fitting piston ring construction for the pistons of automobile and other engines.

And the objects of my invention are:—

First: To provide a piston ring construction in which preferably the middle and the lower piston rings are held under constant resilient pressure against the lower shoulder of the groove in the piston in which the piston ring sets; and the lower piston ring is held under constant resilient pressure against the upper shoulder of the groove in the piston in which the lower piston ring sets.

Second: To provide a new piston ring construction in which the middle and the lower piston rings on the piston illustrated are held under sidewise resilient pressure against one of the shoulders of the grooves in which they are confined, and at the same time the piston rings are held with an additional outward circumferential pressure against the inner circumferential wall of the cylinder.

Third: To provide an automatically operating self-tightening piston ring construction that resiliently holds the piston rings tight against one of the walls or shoulders of the grooves in which they are confined; and to provide piston rings with narrower cylinder bearing surfaces than the width of the rings; and to provide a combination of the piston rings and piston by which oil from the oil reservoir of the automobile circulates freely into the lower piston ring groove and around the piston ring.

I attain these objects by the mechanism illustrated in the accompanying drawings in which:—

Figure 1 is a vertical sectional view through an ordinary internal combustion engine piston, equipped with the improved piston rings.

Figure 2 is a side view of the piston shown in Figure 1.

Figure 3 is a plan view of one of the improved piston rings, showing the pressure spring which fits in an annular recess formed in the said ring.

Figure 4 is an edge view of the pressure spring.

Figure 5 is an enlarged view of one end portion of the piston ring, showing more clearly the annular recess for the pressure spring.

Similar letters refer to similar parts throughout the several views.

Referring to the drawings:—

The numeral 1 designates a piston of the cylinder of an automobile; 2 designates piston ring circumferential grooves in the piston 1; and 3 and 4 designates the piston rings that fit in the grooves 2 and 2ᴬ of the piston.

My piston rings 3 are made to fit snugly, but at the same time free enough to expand and contract in the grooves 2 of the piston 1, and they are made of any suitable metal, resilient steel or tough elastic cast iron being preferred.

I preferably make my piston rings of a little larger diameter inside than the diameter of the grooves in the piston, and a little larger in diameter on the outside than the piston, so that when they are to be put in their grooves in the piston they will have to be sprung out large enough in diameter to go over the outside of the piston and when they come opposite to the grooves 2 they will spring down into them and be a little larger in diameter on their inside diameter and a little larger in diameter on their outside diameter than the piston.

I preferably only use three piston rings in the piston 1, illustrated; the middle ring 3 and the lower ring 4 of which are provided with my resilient shoulder engaging construction, and the upper one is a plain piston ring 8 in a groove 9 formed in the piston 1.

My automatically resilient pressure fitting piston ring construction is as follows:—

On the side 10 of each piston ring that is to stand opposite to the shoulder 7 of the upper and the middle grooves 2 and 2ᴬ of the piston 1, I form a counterbored square shouldered recess 11, which is made a little deeper than the depth of a thin flat elastic ring 12, which is made of resilient spring steel.

This flat spring steel ring, however, is made with several sidewise convolutions 13 in its length, four being illustrated, and it is a little larger in diameter than the inside of the recess 11 in the ring 3 in which it fits snugly and with a very slight outward resilient pressure. As it has to be sprung together slightly in order to insert it in the recess 11 in the ring, consequently it exerts an outward resilient pressure on the ring, as well as the sidewise pressure on one side of the ring that holds it against the shoulders 6 and 6ᴬ of the grooves.

The sidewise convolutions 13 in this flat ring are preferably about an eighth of an inch deep from what would be the straight side plane of this laterally springing ring 13 if it was flattened out flat, but the springing convolutions in it can be made either deeper than an eighth of an inch if desired, and the diameter of the piston and the rings would govern the depth of these laterally springing convolutions on this ring 12.

These offset convolutions 13 of this laterally springing ring 12 bear with a resilient pressure against the shoulders 14 and 15 of the grooves 2 and 2ᴬ and they press the sides 16 and 17 of the piston rings 4 and 5 against the shoulders 7 and 7ᴬ of the grooves 2 and 2ᴬ with pressure to make a practically tight and a thoroughly non-rattling piston ring; and a piston ring tight enough to prevent the explosive gases from blowing between its groove shoulder engaging side and itself and around the ring and past it to the ring below it; and this resilient pressure of one side of the middle and lower rings 3 and 4 will prevent an excess of oil from passing these rings to above the piston to the top of the cylinder and will thus prevent the accumulation of a harmful amount of carbon in the cylinder.

My piston ring construction contemplates any character of overlapping joint at the free meeting ends 18 and 19 of my rings, but I preferably provide each end with a square shouldered recess 20 on the opposite sides of the opposite ends that overlap each other when the rings are in their operative position in the grooves of the piston and in the cylinder of an automobile or other engine, and thus prevent the passage of the expansive gases of the explosions from passing them through their meeting ends.

In constructing my piston rings I preferably bevel off the sides 23, as shown in Figures 1 and 5 so that only a narrow part of the rings bears against the adjacent wall of the grooves. The object of this construction is to reduce the surface of the sides of the rings, and thus have less surface on the rings for carbon to collect on.

The bottom of the lower groove 2ᴬ is provided with small oil holes 21 that extend to the interior of the hollow center 22 of the piston 1, which holes admit oil from the interior of the lower groove that splashes up into the interior of the cylinder and works past the free side of the lower ring into the lower groove.

The operation of my automatic side pressure ring construction in addition to its regular circumferential resilient expansion and that imparted by the additional circumferential expanding pressure of my sidewise resilient pressure ring is clearly described above, but I will add to it the description of the manner of assembling the ring and its convolution sidewise resilient ring into the grooves of the piston, which is as follows:—

The sidewise resilient ring is first inserted in the square shouldered recess formed in the piston ring to receive it, and it is held there by the fingers of both hands, and at the same time the piston ring is expanded until both rings are expanded it passes over the outside diameter of the piston, then it is pushed along the surface of the piston until the groove into which it is to be placed is reached; then it is necessary that the sidewise resilient ring be pressed into the piston ring until it will enter the groove of the piston, into which it naturally contracts to its normally made size but is held constantly by the sidewise expanding resilient pressure of the springing convolutions of the ring 12 against the shoulders 7 and 7ᴬ of the groove 2ᴬ of the grooves of the piston 1. I preferably assemble the middle ring with its ring spring holding it against the lower shoulder of the groove 2, and the lower ring with its ring spring holding it up against the upper shoulder of the groove of the piston 1.

My invention is very simple in construction and inexpensive to make and provides explosive-gas-tight and at the same time non-rattling piston rings.

Having described my invention, what I claim as new and desire to secure by Letters Patent is:

1. The combination with a hollow piston having a packing-ring groove and holes leading from said groove to the interior of the piston of a split ring in said groove having an annular recess in one of its horizontal faces, and a split corrugated spring interposed between the face of said annular recess and the opposing face of said groove.

2. The combination with a hollow piston having a packing-ring groove and downwardly inclined holes leading from the lowest point of said groove to the interior of said piston; of a split ring in said groove having an annular recess on its under side, and a flat corrugated split spring interposed between the face of said annular recess and the opposing face of said groove which is adapted to hold said ring in contact with the upper wall of said groove, thereby permitting oil which works into said groove to pass through said downwardly inclined holes to the interior of the cylinder.

In testimony whereof I affix my signature in presence of two witnesses.

CHARLES E. JOHNSON.

Witnesses:
G. SARGENT ELLIOTT,
ELIZABETH SMITH.